Patented Jan. 9, 1934

1,942,761

UNITED STATES PATENT OFFICE 1,942,761

HALOGEN DERIVATIVES OF ISODIBENZOPYRENEQUINONES

Max Albert Kunz, Mannheim, and Karl Koeberle, Ludwigshafen-on-the-Rhine, Germany, assignors to General Aniline Works, Inc., New York, N. Y., a corporation of Delaware No Drawing. Application December 3, 1929, Serial No. 411,383, and in Germany December 10, 1928

12 Claims. (Cl. 260—61)

The present invention relates to the production of halogenated 4.5.8.9-dibenzopyrene-3.10-quinones.

A process for the manufacture and production of halogen-4.5.8.9-dibenzopyrene-3.10-quinones is described in the British specification No. 287,-845 according to which dyestuffs of the type of 4.5.8.9-dibenzopyrene-3.10-quinone are treated with halogens or halogenating agents in the presence or absence of halogen-transferring catalysts, the halogenation being carried out in chlorosulfonic acid solution. In the said British patent it is shown that the introduction of bromine has the effect of darkening the shades of the scarlet dyeing 4.5.8.9 - dibenzopyrene - 3.10 - quinone (bromo-4.5.8.9-dibenzopyrene-3.10-quinone, prepared according to Example 2 of the said British specification No. 287,845, dyes bluish red shades), and the introduction of chlorine on the contrary has the effect of making the shades lighter in color (chloro-4.5.8.9-dibenzopyrene-3.10-quinone, prepared according to Example 1 of the said British specification No. 287,845, dyes reddish orange shades).

We have now found that particularly valuable halogen - 4.5.8.9 - dibenzopyrene - 3.10 - quinones which are different from the dyestuffs described in the said British specification No. 287,845 and which dye cotton powerful brilliant shades of a more reddish tinge than the unhalogenated initial material, are obtained when halogens or agents supplying halogens are allowed to act upon 4.5.8.9-dibenzopyrene-3.10-quinone or derivatives of the same in the presence of organic solvents or diluents or in the absence of solvents, and preferably in the presence of halogenating catalysts. The organic solvents or diluents which may be used according to our invention comprise such of high boiling point, in particular aromatic hydrocarbons containing negative substituents, such as, for example, nitrobenzene, halogen benzenes, such as di- and trichloro-benzene, nitronaphthalenes, and the like. As catalysts those metals and metalloids and compounds thereof, as are usually employed in halogenating processes, may be used, for example, iron, copper, mercury, antimony, sulphur, iodine, or mixtures of such halogenating catalysts, for instance iron and iodine. The halogenation may be carried out with the free halogens themselves as well as with halogenating agents, in particular inorganic halogenating agents, as, for example, sulfuryl chloride, phosphorus-oxychloride or compounds of halogens with each other, such as chloroiodine and bromoiodine. Such halogenating agents are particularly useful, when the halogenation is effected in the absence of organic solvents or diluents.

The halogenation, according to our invention, can be carried out within a wide range of temperatures, the temperature to be used in each case essentially depending on the initial material, for example on the fact whether it already contains halogen or other substituents or not, and on the reagent employed for halogenation. The temperature may be, for example, as low as 50° C. and even lower, but may also be raised up to the boiling point of the solvent, if such be employed, i. e. up to above 200° C.

The shades produced by the halogen-4.5.8.9-dibenzopyrene-3.10-quinones obtained according to our invention may be varied by the introduction of different halogens, which introduction may be effected by starting with a material which already contains halogen, no matter whether such starting material be produced according to the aforedescribed method or by any other halogenation process or synthetically, and acting thereon with a halogen different from that already present or a halogenating agent supplying such halogen, or such products containing different halogens may be produced by the simultaneous action of different halogens or agents supplying such different halogens in the manner described.

The products obtained according to the aforedescribed halogenation process may be purified and separated from isomeric products by the usual methods, for example by crystallization, sublimation, by dissolving the products in concentrated sulphuric acid and reprecipitation by the addition of water, or by boiling up the products with solvents of high boiling point. A particularly good method for obtaining pure products consists in filtering off the products from the reaction mixture while the latter is still warm, whereby the impurities or isomeric products pass into the filtrate from which the isomeric products may be recovered and, consequently, are not lost.

As already stated above, the halogenated 4.5.8.9-dibenzopyrene-3.10-quinones obtained according to the aforedescribed halogenation method distinctly differ from the corresponding halogenated dyestuffs produced according to the process described in the said British specification No. 287,845 in chlorosulfonic acid solution, in that they all dye vegetable fibres essentially more reddish shades than the said unhalogenated dibenzopyrenequinone and that the shades have no bluish tinge at all or at least a decidedly less bluish tinge than the bromo derivatives produced according to the said British specification. This great difference is most probably due to the fact that in the 4.5.8.9-dibenzopyrene-3.10-quinone of the formula:

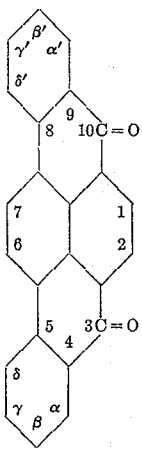

the halogen atoms enter the α, β and γ positions when halogenating according to the method hereinbefore described, in contradistinction to the hitherto known process by which the γ-positions are first substituted. The said assumption is sustained by the fact that the dichloro derivative produced in chlorosulfonic acid furnishes very similar orange red dyeings to those obtained with the dichloro derivatives produced synthetically by condensation of 1.4-di-p-dichlorodibenzoylnaphthalene which condensation product is a γ'-dichloro-4.5.8.9-dibenzopyrene-3.10-quinone. In contradistinction thereto the dichloro derivative obtainable according to Example 8 hereinafter given dyes pure red shades, at least decidedly more reddish shades than the unhalogenated initial material.

The following examples will further illustrate the nature of this invention, but the invention is not restricted to these examples. The parts are by weight.

Example 1

33.2 parts of 4.5.8.9-dibenzopyrene-3.10-quinone, prepared according to the British specification No. 287,050, are suspended in 500 parts of nitrobenzene. After the addition of 3 parts of iodine, the suspension is heated, while stirring, to from 65° to 70° C., 48 parts of sulfuryl chloride are allowed to flow in and the whole is then kept at from 65° to 70° C., until a sample taken out gives pure red dyeings. The whole is then allowed to cool and the dyestuff is filtered off by suction. The dyestuff which is obtained in very good yields and which is a red powder dissolves in concentrated sulfuric acid giving a green brown coloration and dyes cotton red shades from an orange red vat. It may be purified by boiling up with organic solvents or by way of its oxonium sulfate. The dyestuff purified in this or any other suitable manner, which according to analysis is a monochloro-4.5.8.9-dibenzopyrene-3.10-quinone, crystallizes in the form of red needles as fine as hairs and dyes cotton from an orange red vat brilliant, powerful, pure red shades of very good fastness.

Example 2

66 parts of 4.5.8.9-dibenzopyrene-3.10-quinone are suspended in 1500 parts of nitrobenzene. After the addition of 3 parts of iodine and 3 parts of antimony, 60 parts of bromine are allowed to flow in, the reaction mixture being then heated to 100° C., while stirring. The said temperature is maintained for 2 hours and is then raised to 160° C., which temperature is maintained until the bulk of the bromine is used up. The reaction mixture is allowed to cool, and the monobromo-4.5.8.9-dibenzopyrene-3.10-quinone formed filtered off by suction. The solvent may also be removed by distillation with steam, or distilled, if desired, under diminished pressure. The dyestuff obtained forms red needles, dissolves in concentrated sulfuric acid giving an olive brown coloration and dyes cotton from a red vat strong clear red shades.

If the above dyestuff containing bromine is subsequently treated with sulfuryl chloride, for example in the manner described in Example 1, a chloro-bromo-4.5.8.9-dibenzopyrene-3.10-quinone dyeing somewhat more yellowish red shades is obtained. The treatment with sulfuryl chloride may also directly follow the bromination. When brominating at between 180° and 200° C. by means of 120 parts of bromine in the aforedescribed manner, a dibromo derivative dyeing red shades is obtained.

Example 3

200 parts of chloroiodine are added, while stirring, at ordinary temperature to 166 parts of 4.5.8.9-dibenzopyrene-3.10-quinone in 2000 parts of nitrobenzene. The whole is then slowly warmed to 100° C. and kept at this temperature for from 2 to 3 hours and is then heated at 150° C. for a short time. When the bulk of the chloroiodine is used up, the reaction mixture is allowed to cool and the dyestuff is filtered off by suction. The dyestuff containing halogen which is obtained in excellent yields, forms red crystals, dissolves in concentrated sulfuric acid giving an olive brown coloration and dyes cotton from an orange-red vat strong brilliant shades similar to Turkey-red of very good fastness.

If smaller amounts of chloroiodine than those indicated above are employed, dyestuffs are obtained which dye shades of a less bluish tinge, whereas by means of bromoiodine dyestuffs are produced which dye even more bluish tinges.

Example 4

332 parts of finely pulverized 4.5.8.9-dibenzopyrene-3.10-quinone are ground in a ball-mill at between 20° and 30° C. with 300 parts of bromine and 1 part of iodine until a sample furnishes on cotton pure red dyeings. The excess of bromine is then distilled off, the residue taken up with water, to which some sodium bisulfite has been added, and filtered by suction. The bromo-4.5.8.9-dibenzopyrene-3.10-quinone obtained is a red powder and has, as regards the shades obtained therewith and their fastness, properties similar to those of the dyestuff obtained according to Example 2.

A chloro derivative is obtained in an analogous manner by passing a current of chlorine over finely divided 4.5.8.9-dibenzopyrene-3.10-quinone.

Example 5

36 parts of monochloro-4.5.8.9-dibenzopyrene-3.10-quinone, obtainable according to Example 1, are suspended in 300 parts of nitrobenzene, whereupon at between 20° and 30° C. 1.3 parts of iodine and 25 parts of bromine are added, while stirring. The reaction mixture is slowly warmed to 100° C., and after several hours the temperature is raised to 160° C. and kept several hours thereat. The reaction mixture is then allowed to cool, and the chlorobromo-4.5.8.9-dibenzopyrene-3.10-quinone formed is filtered off. It is a red crystalline powder, dissolves in concentrated sulfuric acid to give a green brown solution, and dyes cotton from an orange vat clear pure red shades of very good fastness.

The monobromo-4.5.8.9-dibenzopyrene-3.10-quinone, prepared according to Example 2, is converted into a bromochloro derivative by treating it in a suspension in trichloro benzene with chlorine at a temperature of about 100° C.; it dyes red shades. When raising the temperature the bromine is eliminated and reaction products are obtained dyeing orange red shades.

A monochloro derivative is obtained by treating nitro-4.5.8.9-dibenzopyrene-3.10-quinone with benzoyl chloride, and polychloro derivatives are formed by treating the said nitro compound with chlorine in trichloro benzene.

Example 6

6,6 parts of pure 4.5.8.9-dibenzopyrene-3.10-quinone, obtainable by sublimation of crude 4.5.8.9-dibenzopyrene-3.10-quinone, are suspended in 100 parts of phosphorus oxychloride and heated after the addition of 0.05 part of iodine to 70° C. When a sample furnishes dyeings of a more reddish tinge than the initial material, the reaction mixture is allowed to cool, poured into water and the reaction product filtered off. The chloro derivative thus obtained is a red crystalline powder, dissolving in concentrated sulfuric acid to give an olive brown solution, and dyes cotton from an orange red vat somewhat more yellowish shades than the dyestuff prepared according to Example 1.

Other acid chlorides, such as, for example, sulfuryl chloride, or other substances readily giving off chlorine, such as benzotrichloride, may be used for the chlorination instead of phosphorus oxychloride. Bromination by means of, for instance, phosphorus tribromide proceeds in an analogous manner.

Example 7

41 parts of bromo-4.5.8.9-dibenzopyrene-3.10-quinone, obtainable according to Example 2, are heated to 100° C., while stirring, in 400 parts of nitrobenzene after the addition of 2 parts of iodine. 30 parts of sulfuryl chloride are then allowed to run in and the temperature is kept at between 100° and 110° C., until all of the sulfuryl chloride has been used up. The reaction mixture is then allowed to cool and worked up as usual. The bromochloro-4.5.8.9-dibenzopyrene-3.10-quinone obtained is a crystalline red powder, dissolving in concentrated sulfuric acid to give an olive brown solution, and dyes vegetable fibres from a red vat clear, very fast yellow-red shades.

Reaction products dyeing more yellowish shades are obtained when increasing the amount of sulfuryl chloride employed.

A chloroiodo derivative dyeing red shades is obtained in an analogous manner from iodo-4.5.8.9-dibenzopyrene-3.10-quinone, obtainable from amino-4.5.8.9-dibenzopyrene-3.10-quinone, by way of its diazo compound.

Chlorobromo derivatives are likewise obtained according to the aforesaid method from 4.5.8.9-dibenzopyrene-3.10-quinones containing a comparatively small amount of bromine, produced according to the British specification No. 287,845.

Example 8

33.2 parts of the initial material employed in Example 1 are suspended in 500 parts of nitrobenzene, the suspension being heated to between 80° and 90° C. after the addition of 0.3 part of iodine and 0.3 part of sulfur. 26 parts of sulfuryl chloride are then slowly run in, the temperature being kept between 90° and 100° C. until all of the sulfuryl chloride has been used up, whereupon the reaction mixture is allowed to cool and worked up as usual. The dichloro-4.5.8.9-dibenzopyrene-3.10-quinone is obtained in the form of red needles, dissolves in concentrated sulfuric acid to give a green brown solution and dyes cotton from an orange vat strong clear scarlet red shades of very good fastness.

A dichlorodibromo derivative dyeing yellow red shades is obtained by further bromination of the reaction product.

Higher chlorinated products are obtained by the employment of larger amounts of sulfuryl chloride. Thus, for example, a trichloro derivative is obtained at 100° C. by means of from 3 to 4 molecular proportions of sulfuryl chloride.

The manufacture of products containing different halogens may be carried out in a single operation. Chlorine or other agents furnishing chlorine may be used instead of sulfuryl chloride.

What we claim is:—

1. A process for manufacturing halogenated 4.5.8.9-dibenzopyrene-3.10-quinones, which comprises subjecting a 4.5.8.9-dibenzopyrene-3.10-quinone in an organic suspending medium to the action of a halogenating agent in the presence of a halogenating catalyst.

2. A process for manufacturing halogenated 4.5.8.9-dibenzopyrene-3.10-quinones, which comprises subjecting a 4.5.8.9-dibenzopyrene-3.10-quinone in an organic suspending medium of high boiling point to the action of a halogenating agent in the presence of a halogenating catalyst.

3. A process for manufacturing halogenated 4.5.8.9-dibenzopyrene-3.10-quinones, which comprises subjecting a 4.5.8.9-dibenzopyrene-3.10-quinone in an organic suspending medium of high boiling point to the action of a halogenating agent in the presence of a metalloid.

4. A process for manufacturing halogenated 4.5.8.9-dibenzopyrene-3.10-quinones, which comprises subjecting a 4.5.8.9-dibenzopyrene-3.10-quinone in an organic suspending medium of high boiling point to the action of a halogenating agent in the presence of a metalloid and a metal.

5. A process for manufacturing halogenated 4.5.8.9-dibenzopyrene-3.10-quinones, which comprises subjecting a 4.5.8.9-dibenzopyrene-3.10-quinone in an organic suspending medium of high boiling point to the action of a halogenating agent in the presence of iodine.

6. A process for manufacturing halogenated 4.5.8.9-dibenzopyrene-3.10-quinones, which comprises subjecting a 4.5.8.9-dibenzopyrene-3.10-quinone in an organic suspending medium of high boiling point to the action of a halogenating agent in the presence of iodine and iron.

7. A process for manufacturing halogenated 4.5.8.9-dibenzopyrene-3.10-quinones, which comprises subjecting a 4.5.8.9-dibenzopyrene-3.10-quinone in the absence of a diluting medium to the action of a halogenating agent in the presence of a halogenating catalyst.

8. A process for manufacturing halogenated 4.5.8.9-dibenzopyrene-3.10-quinones, which comprises subjecting a 4.5.8.9-dibenzopyrene-3.10-quinone in the absence of a diluting medium to the action of an inorganic agent supplying halogen.

9. As new articles of manufacture, halogenated 4.5.8.9-dibenzopyrene-3.10-quinones probably corresponding to the formula:

in which the γ and γ' positions are unsubstituted by halogen and at least one of the α, β, and α', β' positions is substituted by halogen, the said halogen compounds dyeing vegetable fibres essentially more reddish shades than the unhalogenated initial material and with a less bluish tinge than the isomeric 4.5.8.9-dibenzopyrene-3.10-quinones halogenated in chlorsulfonic acid, which new halogen compounds are obtainable by halogenating 4.5.8.9-dibenzopyrene-3.10-quinones in organic solvents.

10. As new articles of manufacture, mono halogen derivatives of 4.5.8.9-dibenzopyrene-3.10-quinone probably corresponding to the formula:

in which the γ and γ' positions are unsubstituted by halogen and one of the α, β, and α', β' positions is substituted by halogen, the said halogen compounds dyeing vegetable fibres essentially more reddish shades than the unhalogenated initial material and with a less bluish tinge than the isomeric 4.5.8.9-dibenzopyrene-3.10-quinones halogenated in chlorsulfonic acid.

11. As a new article of manufacture, monobromo-4.5.8.9-dibenzopyrene-3.10-quinone forming red needles, dissolving in concentrated sulfuric acid to give an olive-brown solution and dyeing cotton from a red vat strong clear red shades.

12. As a new article of manufacture, monochloro-4.5.8.9-dibenzopyrene-3.10-quinone crystallizing in the form of fine needles, dissolving in concentrated sulfuric acid to give a green-brown solution and dyeing cotton from an orange-red vat red shades.

MAX ALBERT KUNZ.
KARL KOEBERLE.